Patented Nov. 2, 1948

2,453,092

UNITED STATES PATENT OFFICE 2,453,092

METHOD OF POLYMERIZING ORGANOSILOXANES

James Franklin Hyde and Oscar Kenneth Johannson, Corning, N. Y., assignors to Corning Glass Works, Corning, N. Y., a corporation of New York No Drawing. Application August 5, 1947, Serial No. 766,460

8 Claims. (Cl. 260—448.2)

The present invention relates to the production of organosiloxane polymers from relatively low molecular weight, completely condensed siloxanes.

High molecular weight organosiloxane polymers may be prepared from low molecular weight cyclic diorganosiloxanes by contacting the cyclic siloxanes with an alkali metal hydroxide. By the use of this method siloxanes of high molecular weight may be prepared in the forms of viscous liquids or gels. The siloxanes thus produced are of utility as potting compounds, lubricants, hydraulic fluids, and as intermediates in the production of siloxane fluids, greases, and elastomers. The initiation of the polymerization by this method is slow. A polymerization agent which acts more rapidly to polymerize the cyclic siloxanes would be desirable.

An object of the present invention is to provide improved methods for the production of high molecular weight diorganosiloxanes by the rearrangement of cyclic diorganosiloxanes.

Other objects and advantages of the present invention will be evident from the following description.

In accordance with a preferred form of the present invention, cyclic diorganosiloxanes are polymerized to higher molecular weight polymers by reaction thereof with an alkali metal salt of a triorgano silanol in amount less than one alkali metal atom per 25 silicon atoms.

The cyclic diorganosiloxanes are siloxanes which contain a cycle of alternate oxygen and silicon atoms and which have two organic radicals linked to each silicon atom by carbon to silicon bonds. The cyclic diorganosiloxanes which are employed in the process hereof are those in which at least one of the organic radicals thus attached to each silicon atom is an alkyl radical such as methyl, ethyl, propyl or higher and the other radical is an alkyl, aryl, alkaryl, or aralkyl radicals such as phenyl, tolyl, or benzyl. It is preferred that the cyclic siloxanes employed herein do not contain more than 12 silicon atoms. Mixtures of variously substituted cyclic siloxanes of the indicated types may be polymerized to produce copolymers which contain more than one type of siloxane structural unit. A copolymer which contains dialkylsiloxane structural units in combination with alkyarylsiloxane structural units may be prepared by the polymerization of a mixture of the corresponding cyclic siloxanes with an alkali metal salt of a triorgano silanol. The diaryl siloxanes alone are not susceptible to use in the present method since high molecular weight diarylsiloxanes above about 20 mers per molecule do not appear to be produced.

The alkali metal salts of triorgano silanols are compounds of the type formula $R_3SiOM$, in which R represents organic radicals which are linked to the silicon by carbon to silicon bonding, and M represents an alkali metal. The organic radicals represented by R may be alkyl radicals such as methyl, ethyl, propyl, and higher; aryl, alkaryl, or aralkyl radicals, such as phenyl, tolyl, or benzyl; or any combination of alkyl, aryl, alkaryl, or aralkyl radicals.

The alkali metal salts may be prepared by the reaction of the corresponding triorgano alkoxy silanes, triorgano silanols, or hexaorgano disiloxanes with alkali metal oxides in the presence of water. The alkali metal oxide and the water may be added to the reaction mixture as the alkali metal hydroxide. In order to increase the rate of reaction, it is preferred to add a lower aliphatic alcohol of boiling point below that of water. By the elimination of water from the system, the desired alkali metal salts are obtained, either in the form of crystalline hydrates or as anhydrous salts, depending upon the extent of dehydration. The hydrated salts may be dehydrated by subjecting the hydrates to a high vacuum in the presence of a dehydrating agent. Anhydrous salts may also be obtained by the addition of a solvent of boiling point greater than that of water. After the removal of water and alcohol from the reaction mixture, the anhydrous salt may be obtained from solution in the solvent. Toluene is a suitable higher boiling solvent for this purpose.

Methods of preparation of the alkali metal salts of the type $RR'_2SiOM$, where R represents methyl and R′ methyl or phenyl, are described in greater detail in our copending application S. N. 712,040, filed November 25, 1946.

In accordance with the present invention, the cyclic siloxanes are contacted with the alkali metal salts of the triorganosilanols at a temperature below that at which destructive distillation occurs. The alkali metal salt is employed in amount less than 1 mol of salt per 25 atoms of silicon, and preferably in amount less than 1 mol per 50 atoms of silicon. It has been found that rearrangement of the cyclic siloxanes to form high molecular weight polymers may be effected by the use of less than 1 mol of alkali metal salt per 8000 atoms of silicon.

The mechanism of the reaction is not completely understood though it appears that both the alkali metal and the triorgano silyl portions of the salt molecules enter into the structure of the intermediate materials formed during the process.

The amount of cyclic siloxane polymerized to high molecular weight polymer is not appreciably affected by the concentration of alkali metal salt initially present in the reaction mixture or by the specific temperature at which the polymerization is effected.

To a considerable extent the amount of alkali metal salt initially present in the reaction mixture will control the molecular weight of the polymer produced. The reaction rate is also dependent to some extent upon the initial alkali metal salt concentration. Higher molecular weight polymers are produced by a low alkali metal salt concentration and the reaction rate is approximately proportional to the alkali metal salt concentration.

During the polymerization of cyclic siloxanes as herein described, a disproportionation may occur with the precipitation of alkali metal siloxane salts from the reaction mixture. This disproportionation is apparently caused by the low solubility of the particular alkali metal salts which are formed. The disproportionation results in a decrease in the alkali metal salt concentration, a decrease in reaction rate, and an increase in the molecular weight of the product obtained.

If desired, the polymerization of the cyclic siloxane may be terminated by the addition of a triorgano silicon halide in amount to give a halogen to alkali metal atomic ratio of at least one. By the reaction of the alkali metal salt in the reaction mixture with the triorgano silicon halide, the alkali metal is removed from the reaction mixture as the alkali metal halide and chain terminating triorgano silyl groups are introduced into the polymer.

The polymerization of the cyclic siloxanes to high molecular weight polymers may occur at room temperatures. However, the rate of reaction may be increased by an increase in the reaction temperature. The process is conducted at below the temperature at which destructive distillation occurs. This temperature varies with the pressure employed in the polymerization process. In general, it is preferred that the temperature is maintained below 250° C.

EXAMPLES

Example 1

$(CH_3)_3SiOK$ was prepared by the reaction of hexamethyldisiloxane with potassium amide. Potassium amide was prepared by the reaction of potassium with an excess of liquid ammonia in the presence of a trace of ferric nitrate nonahydrate. Hexamethyldisiloxane was added slowly to the ammonia solution of potassium amide in amount to give a silicon to potassium ratio of 2. The reaction mixture was stirred by a stream of ammonia gas. The ammonia was allowed to evaporate slowly. The reaction products thus obtained were dissolved in diethyl ether and filtered through a fritted glass funnel under dry nitrogen. The solvent and volatile products were removed by distillation at reduced pressure. The potassium salt of trimethyl silanol was obtained as a mass of finely divided crystals of neutralization equivalent 131. The calculated neutralization equivalent of $(CH_3)_3SiOK$ is 128.3.

$(CH_3)_3SiOK$, prepared as above, was added with stirring to octamethylcyclotetrasiloxane in a reaction vessel in amount to give silicon to potassium atomic ratios of from 177–197. The temperature was maintained at temperatures between 77° C. and 171° C. At the time intervals stated in the table below, a sample of the reaction mixture was removed, cooled, and weighed. Sufficient trimethyl silicon chloride in diethyl ether solution was added to the reaction mixture to give a chlorine to potassium ratio of 2. KCl precipitated readily from the reaction mixture and was removed by filtration. The filtrate was heated for 3 hours at a temperature of 100° C. and a pressure of 0.5 mm. to remove the diethyl ether, excess trimethyl silicon chloride, and the octamethylcyclotetrasiloxane which had not been polymerized. The reaction sample was then cooled to 25° C. under anhydrous conditions and weighed. The per cent of cyclic siloxane polymerized to higher molecular weight polymer was calculated from the ratio of the weight of the sample after vacuum treatment to the weight of sample removed from the reaction mixture.

The following results were obtained by this polymerization procedure:

| Temperature | Si/K ratio | Time | Per cent Cyclic Polym. |
|---|---|---|---|
| °C. | | | |
| 77 | 190 | 6 hrs. | 60 |
| | | 12 hrs. | 80 |
| | | 18 hrs. | 86 |
| | | 24 hrs. | 89 |
| 100 | 197 | 1 hr. | 44 |
| | | 2 hrs. | 6. |
| | | 3 hrs. | 7. |
| 120 | 187 | 15 min. | 51 |
| | | 30 min. | 78 |
| | | 45 min. | 86 |
| | | 60 min. | 88 |
| 171 | 177 | 1 min. | 30 |
| | | 3 min. | 63 |
| | | 5 min. | 85 |

Example 2

$(CH_3)_3SiOK$, prepared as in Example 1, was added to octamethylcyclotetrasiloxane in reaction vessels at 100° C. in amount to give four different silicon to potassium ratios. The temperature was maintained at 100° C. Samples of the reaction mixtures were taken and the per cent of the cyclic siloxane polymerized determined by the method of Example 1. The following results were obtained:

| Si/K ratio | Temperature | Time | Per cent Cyclic Poly. |
|---|---|---|---|
| | °C. | | |
| 26.2 | 100 | 15 min. | 44 |
| | | 30 min. | 63 |
| | | 45 min. | 83 |
| 197 | 100 | 1 hr. | 44 |
| | | 2 hrs. | 66 |
| | | 3 hrs. | 72 |
| 1,230 | 100 | 3 hrs. | 40 |
| | | 6 hrs. | 63 |
| | | 9 hrs. | 75 |
| 7,370 | 100 | 3 hrs. | 13 |
| | | 6 hrs. | 29 |
| | | 10 hrs. | 49 |

Example 3

$(CH_3)_3SiOK$, prepared as in Example 1, was added to octamethylcyclotetrasiloxane in reaction vessels in amount to give five different silicon to potassium ratios. The temperatures were maintained at the indicated values until a constant viscosity was obtained. The intrinsic viscosity was determined by the expression $$[\eta] = C \to 0 \, \frac{\eta' - \eta}{\eta C}$$

where $[\eta]$ is the limit of the expression as $C$ approaches zero, $[\eta]$ is the intrinsic viscosity, $\eta$ is the viscosity of the polymer solution, $\eta'$ is the viscosity of the solvent, and $c$ is the concentration of the solution in grams of polymer per 100 ml. of solution.

The following results were obtained where $[\eta]$ was determined using toluene as a solvent:

| Si/K Ratio | Temperature | Time | $[\eta]$ |
|---|---|---|---|
| | °C. | | |
| 51.9 | 120 | 129 min | 0.065 |
| 189 | 77 | 70 hrs | 0.199 |
| 423 | 120 | 122 hrs | 0.281 |
| 1,230 | 100 | 72 hrs | 0.553 |
| 7,370 | 100 | 356 hrs | 0.676 |

Example 4

$(CH_3)_3SiOK$, prepared as in Example 1, was added to three different cyclic dimethylsiloxanes in reaction vessels in amount to give silicon to potassium ratios of from 188 to 192. The temperature in each case was maintained at 77° C. Samples of the reaction mixtures were taken and the per cent of cyclic siloxanes polymerized was determined as in Example 1.

The following results were obtained:

| Cyclic Used | Si/K Ratio | Temp. | Time | Percent polym. |
|---|---|---|---|---|
| | | °C. | | |
| $[(CH_3)_2SiO]_3$ | 188 | 77 | 1 min | 40 |
| | | | 2 min | 75 |
| | | | 3 min | 96 |
| $[(CH_3)_2SiO]_4$ | 190 | 77 | 6 hrs | 60 |
| | | | 12 hrs | 80 |
| | | | 18 hrs | 86 |
| | | | 24 hrs | 89 |
| $[(CH_3)_2SiO]_5$ | 192 | 77 | 3 hrs | 50 |
| | | | 6 hrs | 74 |
| | | | 9 hrs | 85 |

Example 5

$(CH_3)_3SiONa$ was prepared by the reaction of hexamethyldisiloxane with sodium amide. Sodium amide was prepared by the reaction of sodium with an excess of liquid ammonia in a reaction vessel in the presence of a trace of ferric nitrate nonahydrate. Hexamethyldisiloxane was added slowly to the ammonia solution of sodium amide in amount to give a silicon to sodium ratio of 2. The reaction mixture was stirred by a stream of ammonia gas. The ammonia was allowed to evaporate slowly. The reaction products were dissolved in diethyl ether and filtered through a fritted glass funnel under dry nitrogen. The solvent and volatile products were removed by distillation at reduced pressure. The sodium salt of trimethyl silanol was obtained as a mass of finely divided crystals of neutralization equivalent of 113. The calculated neutralization equivalent of $(CH_3)_3SiONa$ is 112.2.

$(CH_3)_3SiONa$, prepared as above, was added with stirring to hexamethylcyclotrisiloxane and 1,2,3,4-tetramethyl, 1,2,3,4-tetraphenylcyclotetrasiloxane in reaction vessels in amount to give a silicon to sodium ratio of 200. The reaction mixtures were maintained at a temperature of 100° C. Samples were taken as in Example 1 and the following results were obtained:

| Si/Na | Cyclic Siloxane | Time | Viscosity |
|---|---|---|---|
| | | Hrs. | Cs. |
| 200 | $[(CH_3)_2SiO]_3$ | 24 | 6,365 |
| 200 | $[(CH_3)_2SiO]_3$ | 48 | 9,941 |
| 200 | $[(C_6H_5)(CH_3)SiO]_4$ | 24 | 22,000 |

Example 6

$(C_6H_5)_3SiONa$ was prepared by the reaction of NaOH with triphenyl silanol. A 33 per cent by weight solution of $(C_6H_5)_3SiOH$ in absolute methanol was added with stirring to powdered NaOH in a reaction vessel in amount to give a silicon to sodium ratio of 1. The methanol was then removed by distillation until crystals began to form in the reaction mixture. At this point a volume of toluene equal to the initial volume of methanol was added. The remainder of the methanol and the water in the reaction mixture were removed by distillation. The toluene was then removed by distillation at reduced pressure. A crystalline salt which was identified as $(C_6H_5)_3SiONa$ was obtained. The neutralization equivalent of the salt obtained was 303.8. The calculated neutralization equivalent of the anhydrous salt is 298.

$(C_6H_5)_2(CH_3)SiONa$ was prepared by the reaction of NaOH with $[(C_6H_5)_2(CH_3)Si]_2O$. Powdered NaOH was added to $[(C_6H_5)_2(CH_3)Si]_2O$ in amount to give a silicon to sodium ratio of 1. The reaction mixture was maintained at 70° to 80° C. for 2 hours and at 120° to 130° C. for 2 hours. The water formed in the reaction was removed at reduced pressure. The reaction product was recrystallized from a mixed solvent composed of toluene and petroleum ether, boiling range 90°–100° C. The recrystallized product was dehydrated at 100° C. and 15 mm. The salt was identified as $(C_6H_5)_2(CH_3)SiONa$. The neutralization equivalent of the salt was 247. The calculated neutralization equivalent for the anhydrous salt is 236.

$(C_6H_5)(CH_3)_2SiONa$ was prepared by the reaction of NaOH with $[(C_6H_5)(CH_3)_2Si]_2O$. NaOH was added to $[(C_6H_5)(CH_3)_2Si]_2O$ in a reaction vessel in amount to give a silicon to sodium ratio of 1. The reaction mixture was warmed to 100° C., and small amounts of anhydrous methanol were added until a single phase mixture was obtained. The methanol was then removed by distillation. The reaction mixture was heated at 125° C. at reduced pressure for 3 hours to remove the water formed in the reaction. Upon cooling a crystalline mass was obtained. The crystals were recrystallized from petroleum ether, boiling range 90°–100° C., and identified as $(C_6H_5)(CH_3)_2SiONa$. The neutralization equivalent of the salt was 181. The calculated neutralization equivalent of the anhydrous salt is 174.

The three described salts were added with stirring to octamethyl cyclotetrasiloxane in reaction vessels in amount to give a silicon to sodium ratio of 200. The reaction mixtures were maintained at a temperature of 100° C. Samples were taken as in Example 1, and the following results were obtained:

| Si/Na | Cyclic Siloxane | Salt | Time | Viscosity |
|---|---|---|---|---|
| | | | Hrs. | Cs. |
| 200 | $[(CH_3)_2SiO]_4$ | $(C_6H_5)_3SiONa$ | 24 | 5.7 |
| | | | 48 | 6.90 |
| | | | 144 | 8.69 |
| | | | 168 | 16.90 |
| 200 | $[(CH_3)_2SiO]_4$ | $(C_6H_5)_2(CH_3)SiONa$ | 24 | 5.5 |
| | | | 48 | 25.59 |
| | | | 144 | 43.47 |
| | | | 168 | 44.27 |
| 200 | $[(CH_3)_2SiO]_4$ | $(C_6H_5)(CH_3)_2SiONa$ | 24 | 7.6 |
| | | | 48 | 10.76 |
| | | | 144 | 18.63 |
| | | | 168 | 20.36 |

Example 7

$(CH_3)_3SiONa$, prepared as in Example 5, was added to a mixture of octamethylcyclotetrasiloxane and 1,2,3,4-tetramethyl, 1,2,3,4-tetraphenyl cyclic tetrasiloxane at 118° C. in equimolar proportions in amount to give a silicon to sodium atomic ratio of 965. The temperature was maintained at 118° C. for 96 hours and at 170° C. for 120 hours. Samples of the reaction mixture were taken and the per cent of cyclic siloxane polymerized determined by the per cent residue after 3 hours at 250° C.-260° C. and 1 micron pressure. The following results were obtained:

| Si/Na | Temperature °C. | Time | Percent Copolymer Poly. |
|---|---|---|---|
| 965 | 118 | 72 min | 2.8 |
| 965 | 118 | 310 min | 8.7 |
| 965 | 118 | 21 hrs | 27.0 |
| 965 | 118 | 46.3 hrs | 39.1 |
| 965 | 170 | 118 hrs | 44.9 |
| 965 | 170 | 216 hrs | 63.5 |

That which is claimed is:

1. The method of polymerizing cyclic diorganosiloxane to higher molecular weight polymers which comprises reacting at least one cyclic diorganosiloxane selected from the group consisting of dialkylsiloxanes and alkylarylsiloxanes with an alkali metal salt of a triorgano silanol until polymerization of the cyclic siloxane is effected.

2. The method of polymerizing cyclic diorganosiloxane to higher molecular weight polymers which comprises reacting at least one cyclic diorganosiloxane selected from the group consisting of dialkylsiloxanes and alkylarylsiloxanes with an alkali metal salt of a triorgano silanol, in amount less than one atom of alkali metal per 25 atoms of silicon, until polymerization of the cyclic siloxane is effected.

3. The method of polymerizing cyclic diorganosiloxane to higher molecular weight polymers which comprises reacting at least one cyclic diorganosiloxane selected from the group consisting of dialkylsiloxanes and alkylarylsiloxanes, said cyclic diorganosiloxanes containing less than 12 silicon atoms per molecule with an alkali metal salt of a triorgano silanol, in amount less than one atom of alkali per 25 atoms of silicon, until polymerization of the cyclic siloxane is effected.

4. The method of polymerizing cyclic diorganosiloxane to higher molecular weight polymers which comprises reacting at least on cyclic diorganosiloxane selected from the group consisting of dialkylsiloxanes and alkylarylsiloxanes, said cyclic diorganosiloxanes containing less than 12 silicon atoms per molecule, with an alkali metal salt of a triorgano silanol, in amount less than one atom of alkali per 25 atoms of silicon, and maintaining reaction mixture formed at a temperature below the temperature at which destructive distillation would occur until polymerization of the cyclic siloxane is effected.

5. The method of polymerizing cyclic diorganosiloxane to higher molecular weight polymers which comprises reacting at least one cyclic diorganosiloxane selected from the group consisting of dialkylsiloxanes and alkylarylsiloxanes, said cyclic diorganosiloxanes containing less than 12 silicon atoms per molecule with an alkali metal salt of a triorgano silanol, in amount less than one atom of alkali per 25 atoms of silicon, in which cyclic siloxane and silanol salt the organic radicals are bonded to the silicon by carbon to silicon bonding, and at a temperature below the temperature at which destructive distillation would occur until polymerization of the cyclic siloxane is effected.

6. The method of polymerizing hexamethylcyclotrisiloxane to a higher molecular weight polymer which comprises reacting hexamethylcyclotrisiloxane with the potassium salt of trimethylsilanol in amount less than one atom of potassium per 50 atoms of silicon.

7. The method of polymerizing octamethylcyclotetrasiloxane to a higher molecular weight polymer which comprises reacting octamethylcyclotetrasiloxane with the potassium salt of trimethylsilanol in amount less than one atom of potassium per 50 atoms of silicon.

8. The method of polymerizing decamethylcyclopentasiloxane to a higher molecular weight polymer which comprises reacting decamethylcyclopentasiloxane with the potassium salt of trimethylsilanol in amount less than one atom of potassium per 50 atoms of silicon.

JAMES FRANKLIN HYDE.
OSCAR KENNETH JOHANNSON.

No references cited.